G. W. PUTNAM.
Car-Coupling.

No. 217,145.  Patented July 1, 1879.

WITNESSES
Franck L. Ouraud
J. J. McCarthy

INVENTOR
G. W. Putnam
Alexander Matson
ATTORNEYS

UNITED STATES PATENT OFFICE.

GEORGE W. PUTNAM, OF GLENS FALLS, ASSIGNOR TO WILLIAM HAMMOND AND R. C. BLACKALL, OF ALBANY, NEW YORK, ONE-FOURTH TO EACH.

IMPROVEMENT IN CAR-COUPLINGS.

Specification forming part of Letters Patent No. 217,145, dated July 1, 1879; application filed May 8, 1879.

*To all whom it may concern:*

Be it known that I, GEORGE W. PUTNAM, of Glens Falls, in the county of Warren, and in the State of New York, have invented certain new and useful Improvements in Car-Couplings; and do hereby declare that the following is a full, clear, and exact description thereof, reference being had to the accompanying drawings, and to the letters of reference marked thereon, making a part of this specification.

The nature of my invention consists in the construction and arrangement of a car-coupling, as will be hereinafter more fully set forth.

In order to enable others skilled in the art to which my invention appertains to make and use the same, I will now proceed to describe its construction and operation, referring to the annexed drawings, in which—

Figure 1:
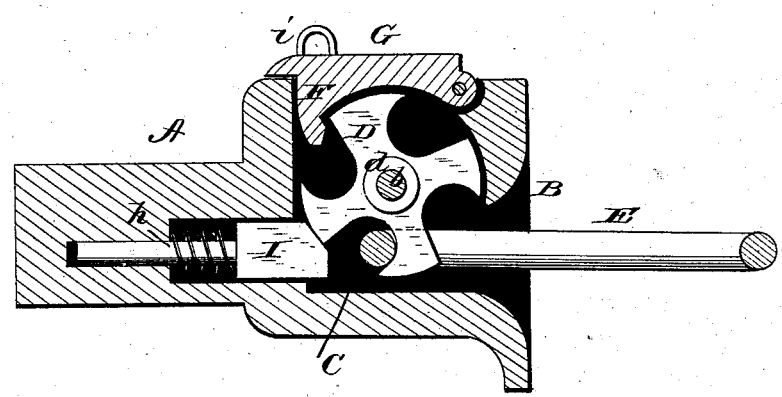
Figure 2:
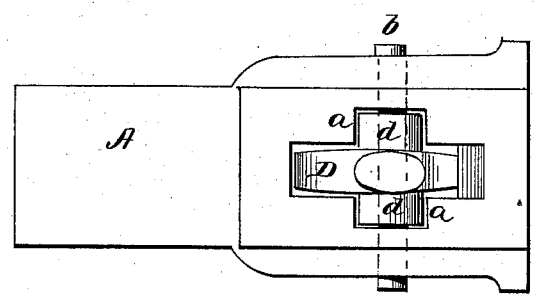

Figure 1 is a longitudinal section of my car-coupling. Fig. 2 is a top view.

A represents the draw-head, constructed with flaring mouth B and interior chamber, C. In the top of the draw-head is made an opening of sufficient size to admit of the insertion of the wheel D, said wheel being formed with a hub, $d$, which projects on both sides of the wheel and enters into vertical grooves $a$, formed in the sides of the chamber C. A pin, $b$, is then passed through the draw-head and hub of the wheel. The hub $d$, having its bearings in the grooves $a$, takes off the strain from the pin when drawing.

The wheel D is shown made with four arms; but any number should be made that it requires to make the spaces between the arms the right size for the link E to pass in between.

On the top of the head is a cap, G, hinged at the front end, and provided on its under side with a pawl or block, F, to fall into the space between two of the arms of the wheel, back of the center, to keep the wheel in position for drawing.

When the link is put in at the mouth it pushes the arm back, and the rear arm raises the cap and passes by the pawl F, and as the cap and pawl drop down again the coupling is completed.

In the rear part of the draw-head is a bolt, I, thrown forward by a spring, $h$. This bolt follows the link when uncoupling and sets the wheel in the right position for coupling.

The device may be uncoupled by attaching a cord or chain to a ring, $i$, on the cap G, and carrying the same to any convenient place on the car.

Having thus fully described my invention, what I claim as new, and desire to secure by Letters Patent, is—

1. The combination of the draw-head A, having top opening and inside vertical side grooves, $a\ a$, the wheel D, with hub $d$ projecting on both sides thereof, and the pin $b$, as and for the purposes herein set forth.

2. The combination of the draw-head A, with interior side grooves, $a$, the wheel D, with hub $d$, and the hinged cap G, with pawl F, substantially as and for the purposes herein set forth.

In testimony that I claim the foregoing I have hereunto set my hand this 26th day of April, 1879.

GEORGE W. PUTNAM.

Witnesses:
HENRY PHILO,
GEO. FERGUSON.